United States Patent
Samii et al.

(10) Patent No.: US 11,318,953 B2
(45) Date of Patent: May 3, 2022

(54) FAULT-TOLERANT EMBEDDED AUTOMOTIVE APPLICATIONS THROUGH CLOUD COMPUTING

(71) Applicant: GM GLOBAL TECHNOLOGY OPERATIONS LLC, Detroit, MI (US)

(72) Inventors: Soheil Samii, Royal Oak, MI (US); Bo Yu, Troy, MI (US); Fan Bai, Ann Arbor, MI (US); Massimo Osella, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 16/584,510

(22) Filed: Sep. 26, 2019

(65) Prior Publication Data
US 2021/0094559 A1    Apr. 1, 2021

(51) Int. Cl.
*B60W 50/023*    (2012.01)
*B60W 30/18*     (2012.01)
*G05D 1/00*      (2006.01)

(52) U.S. Cl.
CPC .... *B60W 50/023* (2013.01); *B60W 30/18009* (2013.01); *G05D 1/0088* (2013.01); *B60W 2556/00* (2020.02); *G05D 2201/0213* (2013.01)

(58) Field of Classification Search
CPC ......... B60W 50/023; B60W 30/18009; B60W 2556/00; G05D 1/0088; G05D 2201/0213
See application file for complete search history.

(56) References Cited

U.S. PATENT DOCUMENTS

| | | | |
|---|---|---|---|
| 2019/0100237 A1* | 4/2019 | Klesing | B62D 5/0484 |
| 2019/0172278 A1* | 6/2019 | Castro Duran | G07C 5/0833 |
| 2019/0337526 A1* | 11/2019 | Rave | G07C 5/008 |
| 2020/0084159 A1* | 3/2020 | Nogin | H04W 12/122 |

* cited by examiner

*Primary Examiner* — Peter D Nolan
*Assistant Examiner* — Ashley L Redhead, Jr.
(74) *Attorney, Agent, or Firm* — Cantor Colburn LLP (57) ABSTRACT

A vehicle, operating system of a vehicle and a method of operating a vehicle is disclosed. A local electronic control unit is operated at the vehicle in order to control the vehicle. A backup electronic control unit is operated at a remote computing platform for control of the vehicle. A control of the vehicle is transferred from the local electronic control unit to the backup electronic control unit upon occurrence of a fault at the local electronic control unit.

20 Claims, 7 Drawing Sheets

FAULT-TOLERANT EMBEDDED AUTOMOTIVE APPLICATIONS THROUGH CLOUD COMPUTING

INTRODUCTION

The subject disclosure relates to systems and methods for increasing fault tolerance and, in particular, to using a cloud computing platform to provide a duplicate control system for a vehicle.

An autonomous vehicle includes a primary control system that performs various calculations and issues various commands in order to operate without input from a driver. In the case that a fault occurs, the autonomous vehicle can notify the driver in order to return control of the vehicle to the driver. However, such a transition requires waiting for the driver to respond to signals provided by the vehicle, which can mean that the vehicle maintains operation for an extended amount of time. In order to maintain control during this transition time, the autonomous vehicle often has a redundant or secondary control system that controls the vehicle when a fault occurs in the primary control system. This redundancy leads to additional hardware and software requirements at the vehicle, which leads to additional space requirements and cost. Accordingly, it is desirable to provide a redundant control system without incurring cost or space requirements at the vehicle.

SUMMARY

In one exemplary embodiment, a method of operating a vehicle is disclosed. a local electronic control unit is operated at the vehicle in order to control the vehicle. A backup electronic control unit is operated at a remote computing platform for control of the vehicle. A control of the vehicle is transferred from the local electronic control unit to the backup electronic control unit upon occurrence of a fault at the local electronic control unit.

In addition to one or more of the features described herein, the remote computing platform is a cloud processor and the backup electronic control unit is a virtual electronic control unit. The same input is sent to both the local electronic control unit and the backup electronic control unit. In one embodiment, the backup electronic control unit sends backup output to the vehicle and a failure mitigation procedure is commenced at the vehicle when the backup output is not received at the vehicle. In another embodiment, the local electronic control unit generates a local output and the backup electronic control unit generates a backup output, and a failure mitigation procedure commences when a difference is detected between the local output and the backup output. A local state of the local electronic control unit is sent to the remote computing platform and a backup state of the backup electronic control unit is updated to the local state of the local electronic control unit. In one embodiment, the backup electronic control unit includes a first backup electronic control unit generating a first backup output and a second backup electronic control unit generating a second backup output, and the method further includes comparing a local output of the local electronic control unit to at least one of the first backup output and the second backup output at the remote computing platform.

In another exemplary embodiment, an operating system for a vehicle is disclosed. The operating system includes a local electronic control unit of the vehicle and a remote computing platform. The local electron control unit is configured to control the vehicle. The remote computing platform provides a backup electronic control unit configured to control the vehicle. The vehicle transfers control of the vehicle from the local electronic control unit to the backup electronic control unit upon occurrence of a fault at the local electronic control unit.

In addition to one or more of the features described herein, the remote computing platform is a cloud processor and the backup electronic control unit is a virtual electronic control unit. The local electronic control unit and the backup electronic control unit operate using a same input. In one embodiment, the backup electronic control unit sends backup output to the vehicle and the vehicle commences a failure mitigation procedure when the backup output is not received at the vehicle. In another embodiment, the local electronic control unit generates a local output, the backup electronic control unit generates a backup output, and the vehicle commences a failure mitigation procedure when a difference is detected between the local output and the backup output. The vehicle sends a local state of the local electronic control unit to the remote computing platform and the backup electronic control unit updates its backup state to that of the local state of the local electronic control unit. In one embodiment, the backup electronic control unit includes a first backup electronic control unit that generates a first backup output and a second backup electronic control unit that generates a second backup output, and a cloud watchdog of the remote computing platform compares a local output of the local electronic control unit to at least one of the first backup output and the second backup output.

In another exemplary embodiment, a vehicle is disclosed. The vehicle includes a local electronic control unit configured to control the vehicle. The vehicle is in communication with a remote computing platform configured to provide a backup electronic control unit for controlling the vehicle. The vehicle is configured to transfer control of the vehicle from the local electronic control unit to the backup electronic control unit upon occurrence of a fault at the local electronic control unit.

In addition to one or more of the features described herein, the local electronic control unit and the backup electronic control unit operate using a same input. In one embodiment, the backup electronic control unit sends backup output to the vehicle and the vehicle is further configured to commence a failure mitigation procedure when the backup output is not received at the vehicle. In another embodiment, the local electronic control unit generates a local output and the backup electronic control unit generate a backup output, and the vehicle further configured to commence a failure mitigation procedure when a difference is detected between the local output and the backup output. The vehicle is further configured to send a local state of the local electronic control unit to the remote computing platform for updating the backup state of the backup electronic control unit to the local state of the local electronic control unit. In one embodiment, the backup electronic control unit further includes a first backup electronic control unit that generates a first backup output and a second backup electronic control unit that generates a second backup output, and the vehicle is configured to operate based on a comparison of a local output of the local electronic control unit to at least one of the first backup output and the second backup output performed at a cloud watchdog of the remote computing platform.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
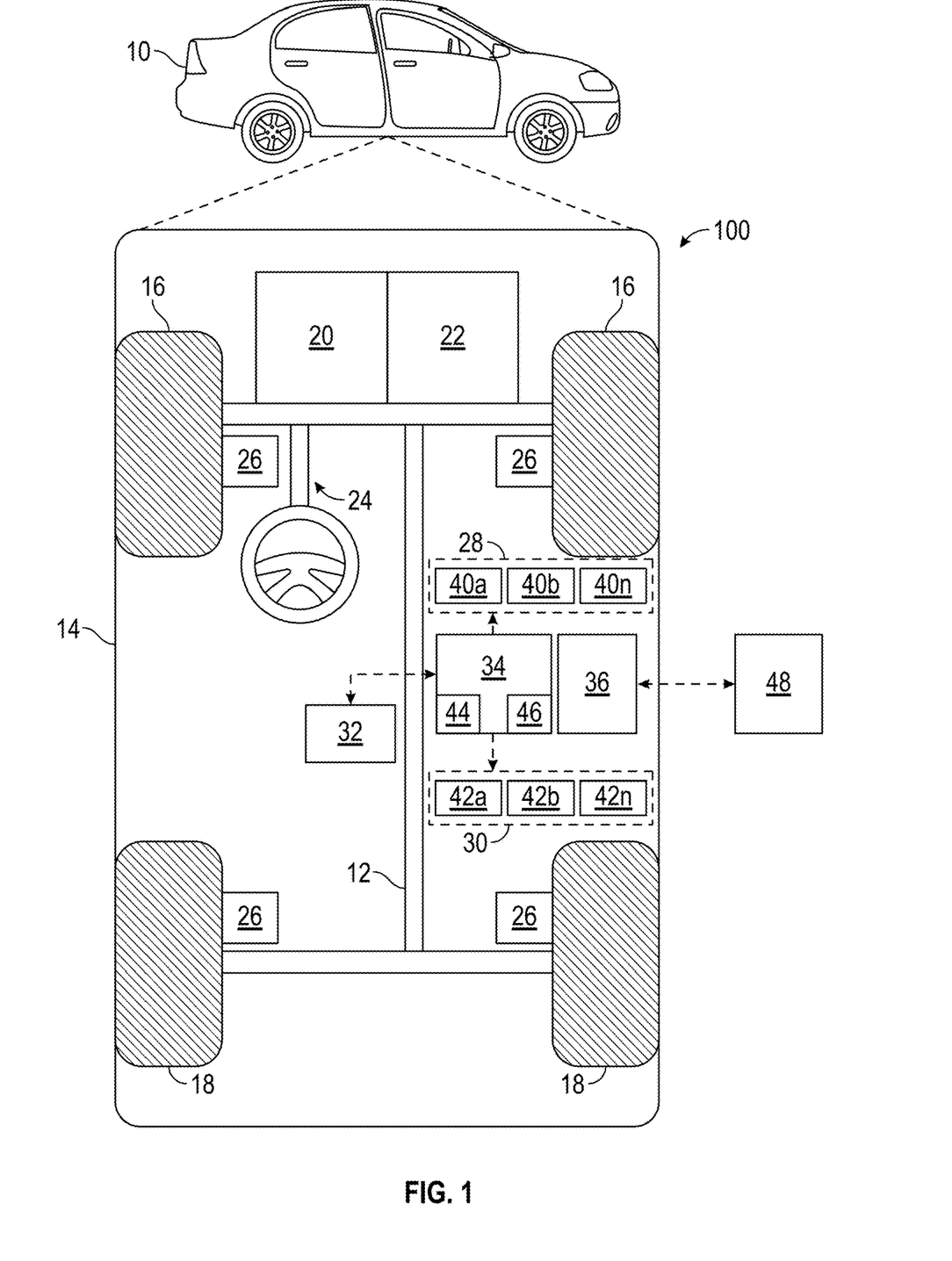
FIG. 1 shows a vehicle in an exemplary embodiment.

In accordance with an exemplary embodiment, FIG. 1 shows a vehicle 10. In an exemplary embodiment, the vehicle 10 is a semi-autonomous or autonomous vehicle. In various embodiments, the vehicle 10 includes at least one driver assistance system for both steering and acceleration/deceleration using information about the driving environment, such as cruise control and lane-centering. While the driver can be disengaged from physically operating the vehicle 10 by having his or her hands off the steering wheel and foot off the pedal at the same time, the driver must be ready to take control of the vehicle.

In general, a trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors for observing and measuring parameters of the exterior environment. The sensing devices 40a-40n may further include brake sensors, steering angle sensors, wheel speed sensors, etc. for observing and measuring in-vehicle parameters of the vehicle. The cameras can include two or more digital cameras spaced at a selected distance from each other, in which the two or more digital cameras are used to obtain stereoscopic images of the surrounding environment in order to obtain a three-dimensional image. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The at least one controller 34 includes at least one processor 44 and a computer readable storage device or media 46. The at least one processor 44 can be any custom made or commercially available processor, a central processing unit (CPU), a graphics processing unit (GPU), an auxiliary processor among several processors associated with the at least one controller 34, a semiconductor-based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the at least one processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the at least one controller 34 in controlling the vehicle 10.

The instructions may include one or more separate programs, each of which comprises an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller is shown in FIG. 1, embodiments of the vehicle 10 can include any number of controllers that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
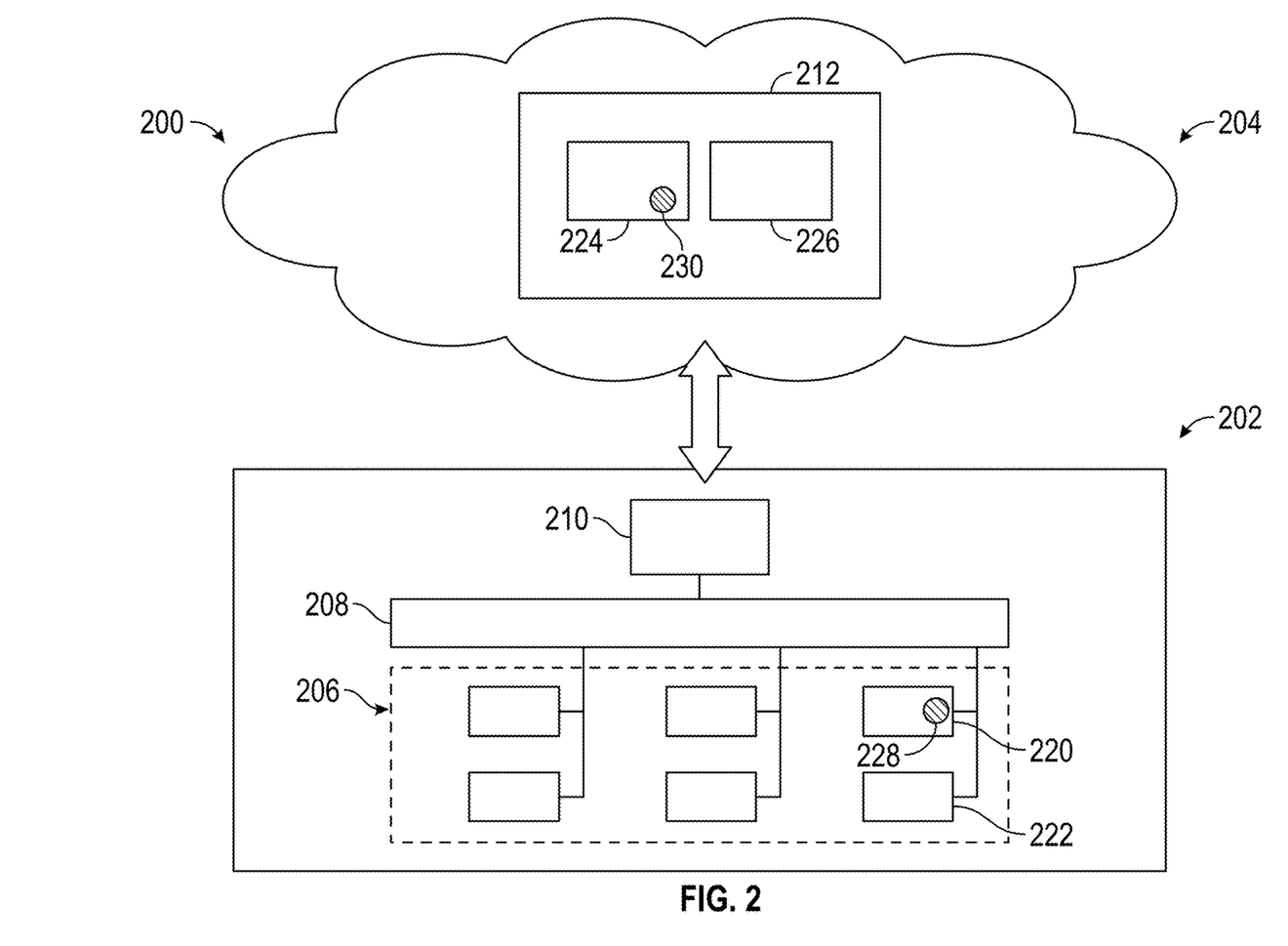
FIG. 2 shows a block diagram of an operating system for operating a vehicle in the occurrence of a fault in a control unit of the vehicle.

FIG. 2 shows a block diagram of an operating system 200 for operating a vehicle 10 in the occurrence of a fault in a control unit of the vehicle. The operating system 200 includes a vehicle electronics 202 and a remote computing platform 204. The vehicle electronics 202 includes a plurality of electronic control units (ECUs) 206 on-board the vehicle 10 for control and operation of various components of the vehicle. The plurality of ECUs 206 is connected to a gateway 208 that provides a communication path between the ECUs 206 and a telematics module 210. The telematics module communicates data from the ECUs 206 to the remote computing platform 204 and also receives data from the remote computing platform 204. The telematics module 210 can communicate with the remote computing platform 204 using any suitable protocol, such as but not limited to, 4G Cellular, 5G Cellular, IEEE 802.11x (WiFi, DSRC). The operating system 200 includes the ability to have new features or software updates downloaded wirelessly to the vehicle.

The remote computing platform 204 can include any suitable remote computer 212 such as a cloud computer, cloud processor a cloud computer cluster or a multi-access edge computing system, etc. In various embodiments, the remote computing platform 204 operates a virtual ECU to act as backup for a local ECU of the autonomous vehicle. For illustrative purposes, a first local ECU 220 and second local ECU 222 are shown as components of the vehicle electronics 202. The remote computing platform 204 is shown operating a first backup ECU 224 to back up the first local ECU 220 and a second backup ECU 226 to back up the second local ECU 222. A primary software process 228 for controlling the vehicle 10 or a component of the vehicle is running on the first local ECU 220. Meanwhile, a backup software process 230 is running on the first backup ECU 224 in order to provide continuous operation of the vehicle in the event of occurrence of a fault at the first local ECU 220.

Figure 3:
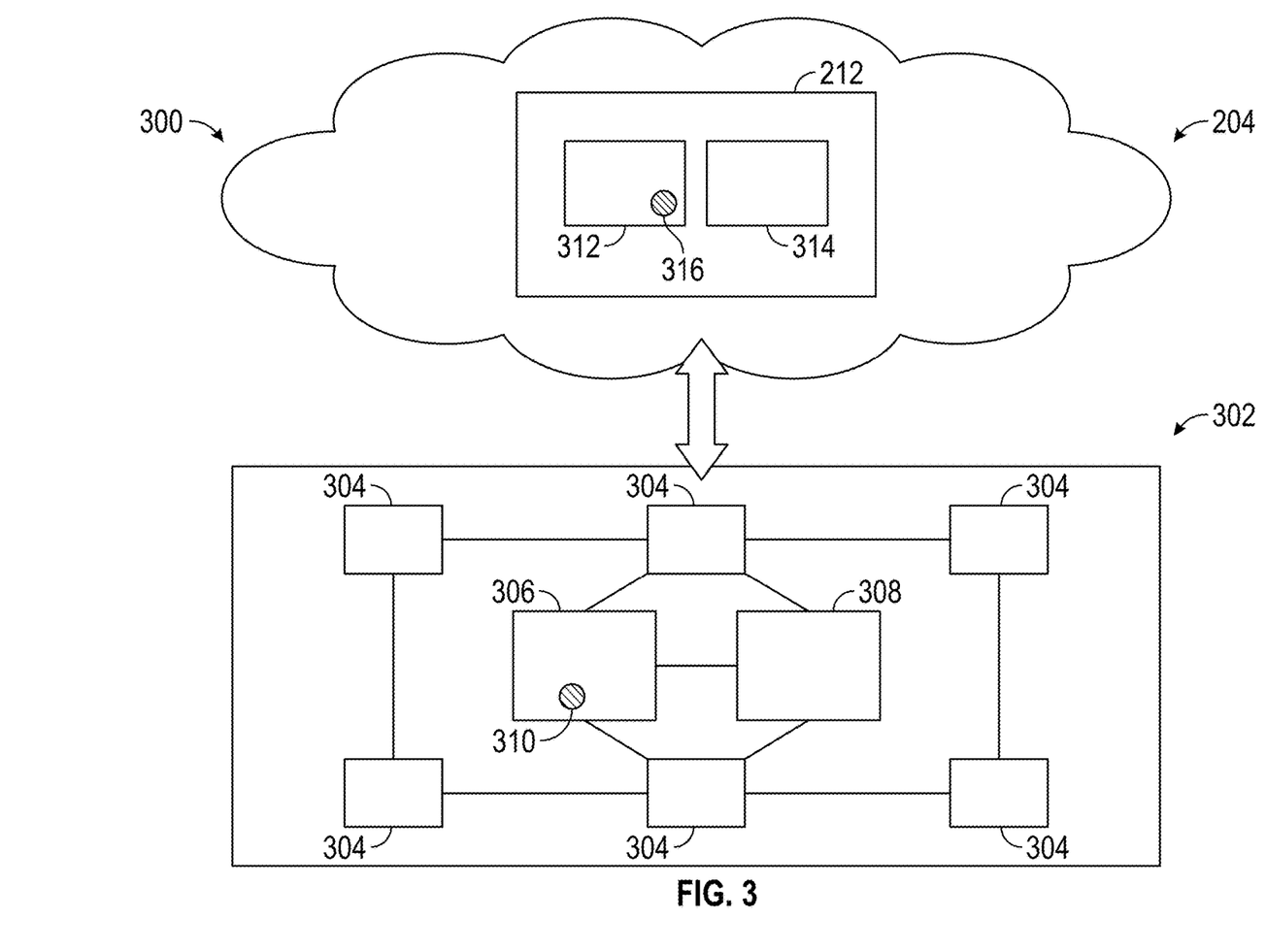
FIG. 3 shows a block diagram of an alternate operating system for operating an autonomous vehicle in the occurrence of a fault in a control unit of the vehicle.

FIG. 3 shows a block diagram of an alternate operating system 300 for operating an autonomous vehicle in the occurrence of a fault in a control unit of the vehicle. The alternate operating system 300 includes a zone-based vehicle electronics 302 and a remote computing platform 204. The zone-based vehicle electronics 302 includes a plurality of zone modules 304. Each zone module 304 controls and operates various electronic instruments (not shown) within a selected zone of the vehicle 10. The zone modules 304 communicate with various computer modules. For illustrative purposes, a first computer module 306 and a second computer module 308 are shown. In various embodiments, a zone module 304 can collect data from various sensors within the zone and communicate the data to one or more of the first computer module 306 and the second computer module 308, which can process the data and return a command to the zone module 304 for operating electronic instruments within the selected zone.

The remote computing platform 204 can include any suitable remote computer 212 such as a cloud computer, cloud processor, cloud computer cluster or multi-access edge computing system, in various embodiments. The remote computing platform 204 operates at least one virtual ECU to act as backup for the computer modules of the vehicle 10. For illustrative purposes, a first backup ECU 312 and a second backup ECU 314 are shown, both of which can be virtual ECUs. The first computer module 306 and second computer module 308 can communicate with the remote computing platform 204 using any suitable protocol, such as but not limited to, 4G Cellular, 5G Cellular, IEEE 802.11x (WiFi, DSRC).

For illustrative purposes, a primary software process 310 for controlling the vehicle or a component of the vehicle is being performed on the first computer module 306. A backup software process 316 is being performed on the first backup ECU 312 of the remote computing platform 204 in order to provide continuous operation of the vehicle in the event of occurrence of a fault at the first computer module 306.

Figure 4:
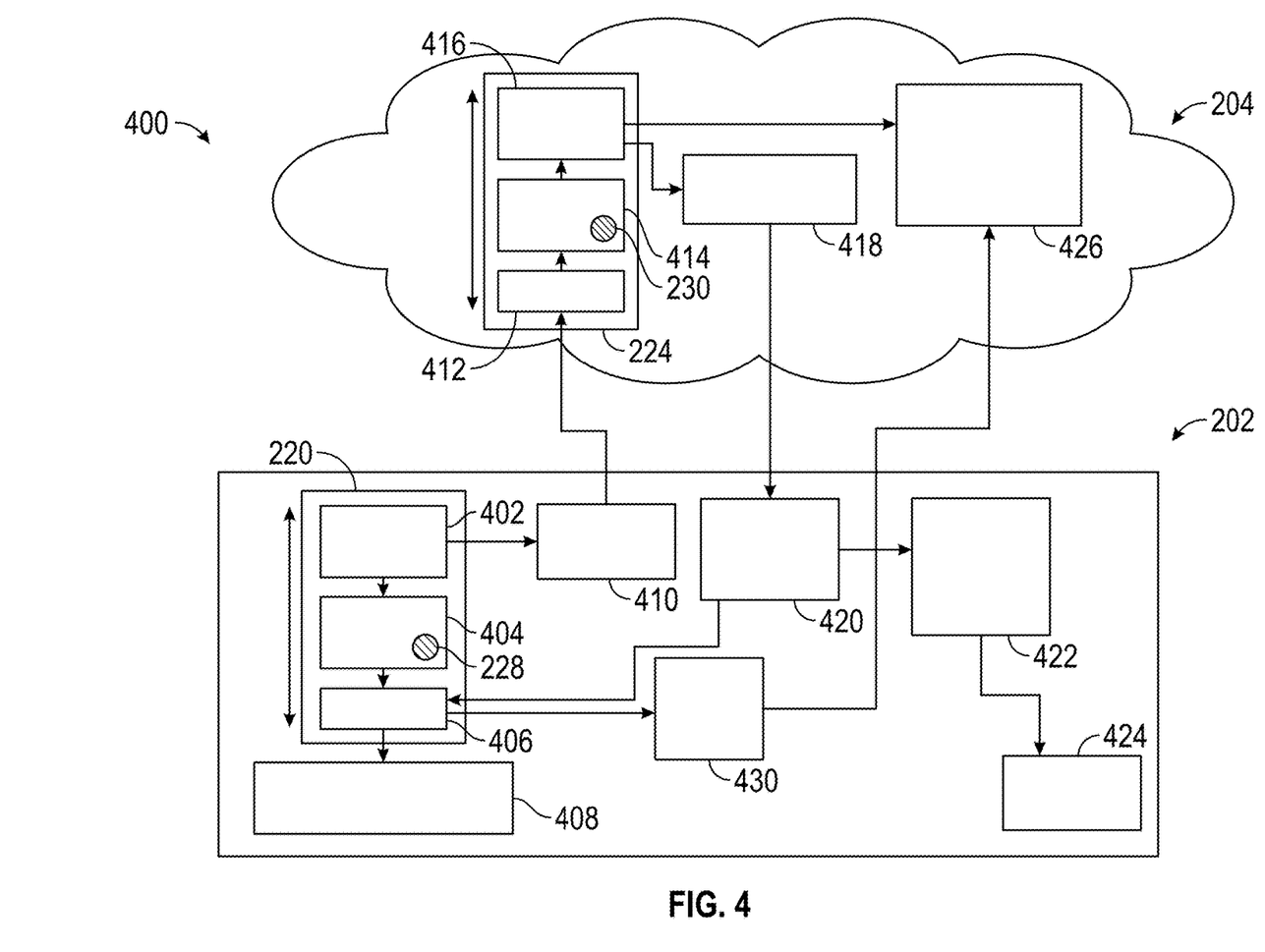
FIG. 4 shows a data flow diagram illustrating operation of the operating systems of FIG. 2 or 3.

FIG. 4 shows a data flow diagram 400 illustrating operation of the operating systems of FIG. 2 or 3, in an embodiment. The data flow diagram 400 includes various processes that are performed at the vehicle electronics 202 and other processes that are performed at the remote computing platform 204.

For illustrative purposes, only the first local ECU 220 of the vehicle electronics 202 is shown. Various operations of the vehicle electronics 202 are performed on the first local ECU 220. The first local ECU 220 receives inputs (box 402) and executes a primary program (box 404) using the inputs and generates output (box 406). The input can be any data or sensed measurements received at the vehicle and the output can be a command or a value to be displayed in various embodiments. The operation of the first local ECU 220 can be periodic or sporadic or event-based, in various embodiments. The output is provided to an actuator device (box 408) or other suitable device of the vehicle 10 in order to perform an action at the vehicle based on the input to the first local ECU 220.

Similarly, the remote computing platform 204 is shown only with the first backup ECU 224 for illustrative purposes. The input that is provided to the first local ECU 220 (or a copy of the input) is transmitted or sent (box 410) to the remote computing platform 204 and used as input to the first backup ECU 224. The first backup ECU 224 receives the inputs (box 412) and executes a backup program (box 414), thereby generating backup output (box 416). The backup program is generally the same as the primary program being executed at the first local ECU 220. The backup output can be transmitted (box 418) from the remote computing platform 204 and received (box 420) at the vehicle electronics 202. In the event that a fault occurs at the first local ECU 220 and thus no output is generated at the first local ECU 220, the backup output can be used to control operation of the actuator device (box 408).

The vehicle electronics 202 further includes a local watchdog program (box 422) that monitors the operation of the vehicle electronics 202 and of the first local ECU 220. In one embodiment, the local watchdog program (box 422)

monitors the reception of the backup output from the remote computing platform 204. As long as the backup output is received at regular or expected intervals, the local watchdog program (box 422) allows normal operation of the first local ECU and of the vehicle electronics 202. If there is a disruption in the reception of the backup output, or if the backup output is no longer being received, the local watchdog program (box 422) can commence a failure mitigation operation (box 424). Failure mitigation can include shutting down the vehicle, turning over control of the vehicle to the driver, sounding an alarm, commencing a repair program, etc.

The remote computing platform 204 also includes a remote watchdog program (box 426) for comparing the backup output to local output. In various embodiments, the local output from the first local ECU 220 is sent (box 430) to the watchdog program (box 426) as well as the backup output (box 416). The remote watchdog program (box 426) compares the backup output to the local output in order to determine whether the outputs match each other, indicating proper operation of the first local ECU 220. The results of the comparison can be used to notify the vehicle electronics, which can commence the process of failure mitigation.

Figure 5:
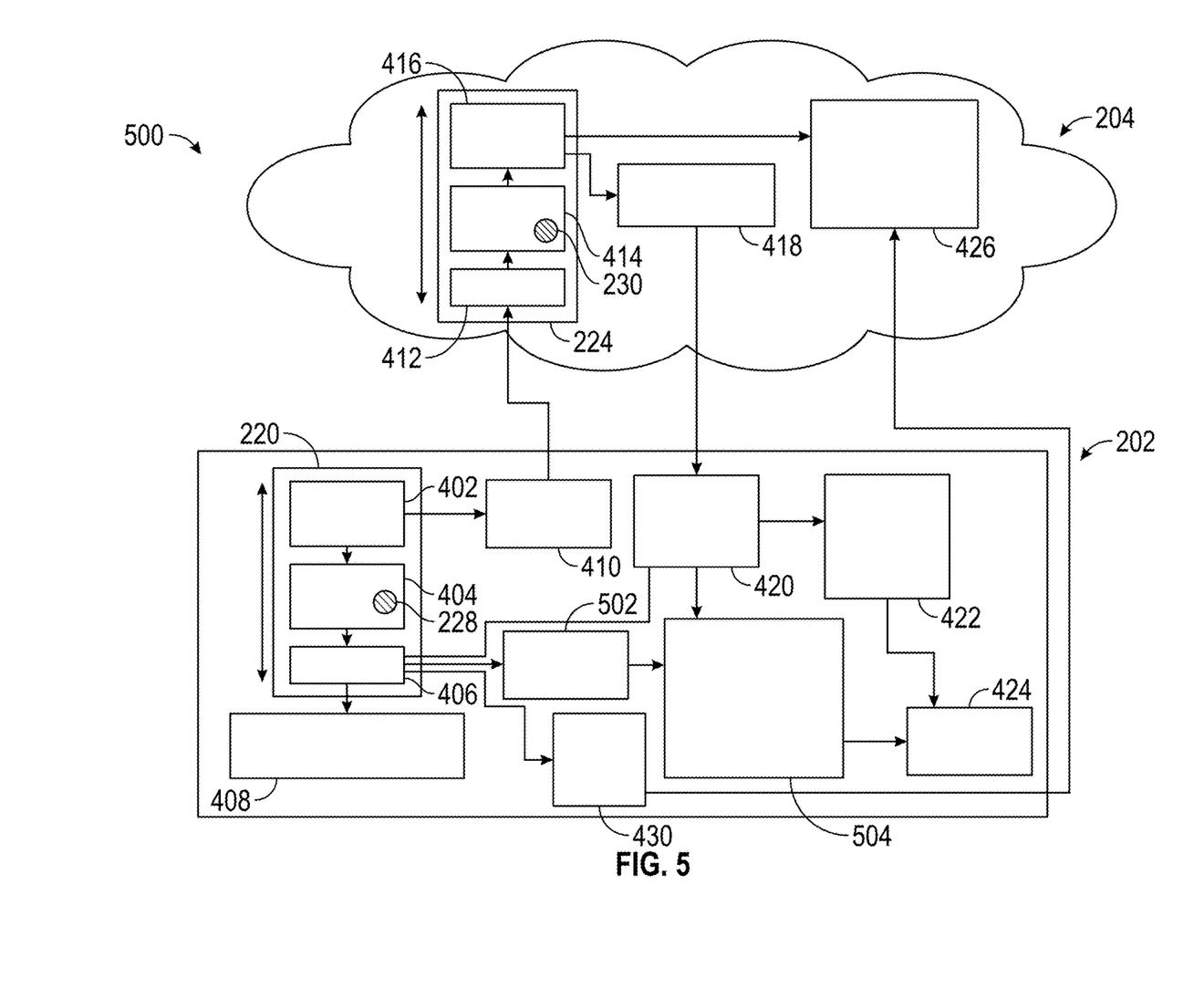
FIG. 5 shows a data flow diagram 500 illustrating additional data operations of the operating systems of FIGS. 2 and 3.

FIG. 5 shows a data flow diagram 500 illustrating additional data operations of the operating systems of FIGS. 2 and 3, in an embodiment. The data flow diagram 500 includes the data operations discussed with respect to FIG. 4. The additional data operations of FIG. 5 provide an awareness of differences between the local output and the backup output. The local output can be held in a buffer (box 502). The backup output is received (box 420) at the vehicle electronics 202 from the remote computing platform 204. The local output from the buffer and the received backup output are compared to each other (box 504). The comparison is used to detect any errors or differences between the local output and the backup output. Such differences can indicate an error at the first local ECU 220, requiring that the driver be notified. Upon detecting an error or difference, a signal can be sent to the failure mitigation program (box 424) in order to perform a shutdown or escalation to the driver control. In various embodiments, failure mitigation includes transferring operation of the vehicle to the remote computing platform or, in other words, using the backup output to operate the vehicle or actuator of the vehicle. The backup output can be used while the vehicle takes the other mitigation steps of shutting down the vehicle, turning over control of the vehicle to the driver, sounding an alarm, commencing a repair program, etc.

Figure 6:
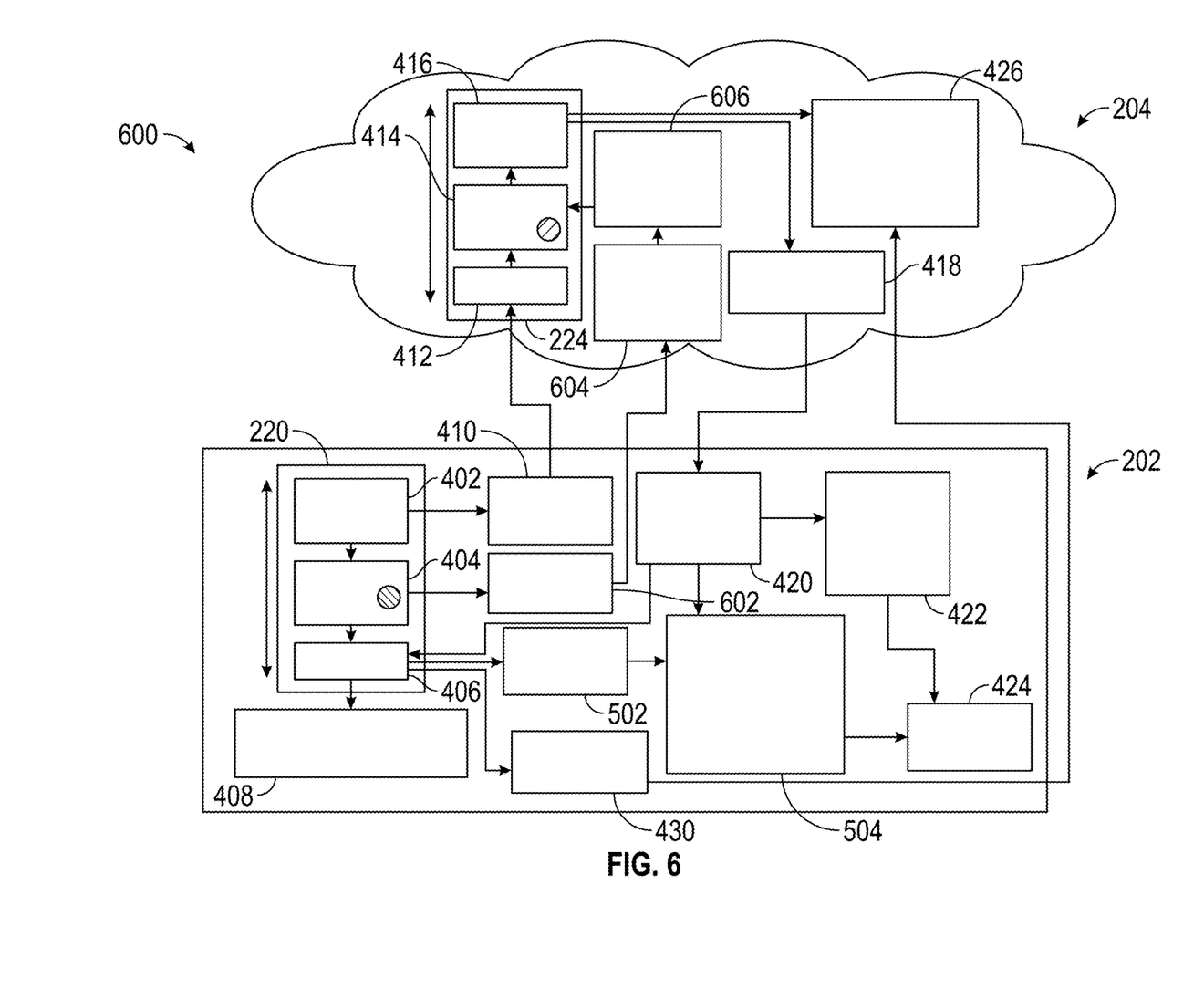
FIG. 6 shows a data flow diagram 600 illustrating additional data operations of the operation systems of FIGS. 2 and 3.

FIG. 6 shows a data flow diagram 600 illustrating additional data operations of the operation systems of FIGS. 2 and 3, in an embodiment. The data flow diagram 500 includes the data operations discussed with respect to FIG. 5. In addition, the data flow diagram 600 includes data operations for notifying a local state of the first local ECU 220 to the remote computing platform 204. During normal operation of the first local ECU 220, the first backup ECU 224 can be operated on an intermediate or sporadic basis, updating its backup state only in order to stay more or less current with the operation or current state of the first local ECU 220. The first local ECU 220 can send a parameter indicative of its local state (box 602) to the remote computing platform 204. The state parameter is received (box 604) at the remote computing platform 204. The state parameter is used at the remote computing platform 204 in order to run or update the first backup ECU 224 in order to mitigate a latency between the first backup ECU 224 and the first local ECU 220 (box 606). For example, when the first backup ECU 224 is behind the first local ECU 220 by a selected time threshold, the first backup ECU 224 can operate to update its state (the backup state) to the local state of the first local ECU 220.

Figure 7:
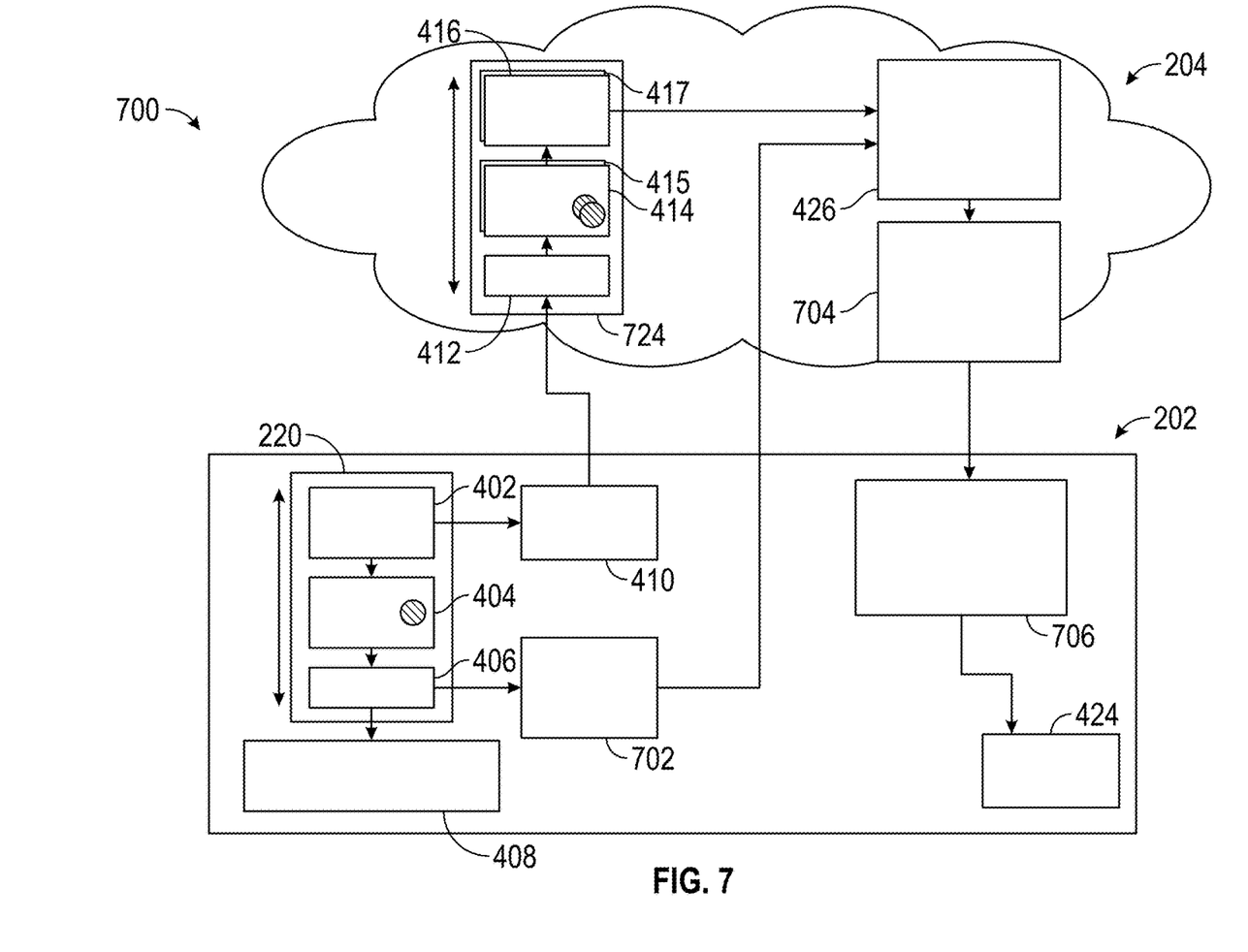
FIG. 7 shows a data flow diagram 700 illustrating operation of the operation systems of FIGS. 2 and 3.

FIG. 7 shows a data flow diagram 700 illustrating operation of the operation systems of FIGS. 2 and 3, in an alternate embodiment. In the vehicle electronics 202, the first local ECU 220 receives inputs (box 402), executes a primary program (box 404) using the inputs and generates output (box 406), which are sent to a suitable actuator device (box 408) to control the vehicle or a component of the vehicle. The inputs are also sent to the remote computing platform 204 (box 410).

The remote computing platform 204 includes a plurality of backup ECUs 724 which provide a redundancy to the first local ECU 220. For illustrative purposes, the plurality of backup ECUs 724 includes a first backup ECU and a second backup ECU. The first backup ECU receives the inputs (box 412) and executes a first backup program (box 414) on the inputs to generate first backup output (box 416). The second backup ECU receives the inputs (box 412) and executes a second backup program (box 415) on the inputs to generate second backup output (box 417). The first backup output (box 416) and the second backup output (box 417) are sent to a cloud watchdog (box 426)

In various embodiments, the local output is sent (box 702) to the cloud watchdog (box 426) of the remote computing platform 204 for a data integrity check. The local output, the first backup output and the second backup output are compared to each other at the cloud watchdog (box 426). The remote cloud watchdog program (box 426) can compare the local output, the first backup output and the second backup output to each other in order to determine whether there is a malfunction or fault at the first local ECU 220. The remote watchdog program (box 426) can perform triple-mode redundancy voting in order to provide an adequate output for temporary control of the vehicle. Based on the results of the triple-mode redundancy, the vehicle electronics 202 is notified of any potential security malfunction or potential misbehavior (box 704). At the vehicle electronics 202, a cloud data integrity is checked (box 706). In various embodiments, the data integrity check can be performed using symmetric key encryption. If the fault is confirmed, the vehicle performs a failure mitigation procedure (box 424).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a vehicle, comprising:
    operating, at the vehicle, a local electronic control unit for control of the vehicle based on an input;
    sending the input to a remote computing platform;
    operating, at the remote computing platform, a backup electronic control unit for control of the vehicle using the input to generate a backup output, wherein the backup electronic control unit is configured to send the backup output from the remote computing platform to the vehicle, wherein the backup electronic control unit operates at the same time as the local electronic control unit; and transferring a control of the vehicle from the local electronic control unit to the backup electronic control unit upon occurrence of a fault at the local electronic control unit to operate the vehicle using the backup output to provide continuous operation of the vehicle at the occurrence of the fault.

2. The method of claim 1, wherein the remote computing platform is a cloud processor and the backup electronic control unit is a virtual electronic control unit.

3. The method of claim 1, further comprising sending a same input to both the local electronic control unit and the backup electronic control unit.

4. The method of claim 1, further comprising commencing a failure mitigation procedure at the vehicle when the backup output is not received at the vehicle.

5. The method of claim 1, wherein the local electronic control unit generates a local output, further comprising commencing a failure mitigation procedure when a difference is detected between the local output and the backup output.

6. The method of claim 1, further comprising sending a local state of the local electronic control unit to the remote computing platform and updating a backup state of the backup electronic control unit to the local state of the local electronic control unit.

7. The method of claim 1, wherein the backup electronic control unit further comprises a first backup electronic control unit generating a first backup output and a second backup electronic control unit generating a second backup output, further comprising comparing a local output of the local electronic control unit to at least one of the first backup output and the second backup output at the remote computing platform.

8. An operating system for a vehicle, comprising:
a local electronic control unit of the vehicle configured to control the vehicle based on an input; and
a remote computing platform configured to provide a backup electronic control unit configured to generate a backup output based on the input for control of the vehicle, wherein the backup electronic control unit operates at the same time as the local electronic control unit; and
a telematics module for communicating the input from the vehicle to the remote computing platform and the backup output form the remote computing platform to the vehicle;
wherein the vehicle transfers control of the vehicle from the local electronic control unit to the backup electronic control unit upon occurrence of a fault at the local electronic control unit to operate the vehicle using the backup output to provide continuous operation of the vehicle at the occurrence of the fault.

9. The operating system of claim 8, wherein the remote computing platform is a cloud processor and the backup electronic control unit is a virtual electronic control unit.

10. The operating system of claim 8, wherein the local electronic control unit and the backup electronic control unit operate using a same input.

11. The operating system of claim 8, wherein the vehicle commences a failure mitigation procedure when the backup output is not received at the vehicle.

12. The operating system of claim 8, wherein the local electronic control unit generates a local output and the vehicle commences a failure mitigation procedure when a difference is detected between the local output and the backup output.

13. The operating system of claim 8, wherein the vehicle sends a local state of the local electronic control unit to the remote computing platform and the backup electronic control unit updates its backup state to that of the local state of the local electronic control unit.

14. The operating system of claim 8, wherein the backup electronic control unit further comprises a first backup electronic control unit that generates a first backup output and a second backup electronic control unit that generates a second backup output, wherein a cloud watchdog of the remote computing platform compares a local output of the local electronic control unit to at least one of the first backup output and the second backup output.

15. A vehicle, comprising:
a local electronic control unit of the vehicle configured to control the vehicle based on an input, the vehicle configured to provide the input to a backup electronic unit at a remote computing platform, the backup electronic control unit configured to generate a backup output based on the input for controlling the vehicle, wherein the backup electronic control unit operates at the same time as the local electronic control unit; and
a telematics module for communicating the input from the vehicle to the remote computing platform and the backup output form the remote computing platform to the vehicle;
wherein the vehicle is configured to transfer control of the vehicle from the local electronic control unit to the backup electronic control unit upon occurrence of a fault at the local electronic control unit to operate the vehicle using the backup output to provide continuous operation of the vehicle at the occurrence of the fault.

16. The vehicle of claim 15, wherein the local electronic control unit and the backup electronic control unit operate using a same input.

17. The vehicle of claim 15, wherein the vehicle is further configured to commence a failure mitigation procedure when the backup output is not received at the vehicle.

18. The vehicle of claim 15, wherein the local electronic control unit generates a local output and the vehicle is further configured to commence a failure mitigation procedure when a difference is detected between the local output and the backup output.

19. The vehicle of claim 15, wherein the vehicle is further configured to send a local state of the local electronic control unit to the remote computing platform for updating the backup state of the backup electronic control unit to the local state of the local electronic control unit.

20. The vehicle of claim 15, wherein the backup electronic control unit further comprises a first backup electronic control unit that generates a first backup output and a second backup electronic control unit that generates a second backup output, wherein the vehicle is configured to operate based on a comparison of a local output of the local electronic control unit to at least one of the first backup output and the second backup output performed at a cloud watchdog of the remote computing platform.

* * * * *